(12) United States Patent
Davis et al.

(10) Patent No.: US 7,949,534 B2
(45) Date of Patent: May 24, 2011

(54) SPEECH RECOGNITION AND TRANSCRIPTION AMONG USERS HAVING HETEROGENEOUS PROTOCOLS

(75) Inventors: Michael K. Davis, Phoenix, AZ (US); Joseph Miglietta, Melbourne, FL (US); Douglas Holt, Gilbert, AZ (US)

(73) Assignee: Advanced Voice Recognition Systems, Inc., Scottsdale, AZ (US)

( * ) Notice: Subject to any disclaimer, the term of this patent is extended or adjusted under 35 U.S.C. 154(b) by 0 days.

(21) Appl. No.: 12/497,675

(22) Filed: Jul. 5, 2009

(65) Prior Publication Data

US 2009/0271194 A1    Oct. 29, 2009

Related U.S. Application Data

(63) Continuation of application No. 11/824,794, filed on Jul. 3, 2007, now Pat. No. 7,558,730.

(51) Int. Cl.
*G10L 21/00* (2006.01)
(52) U.S. Cl. ......... 704/270.1; 704/9; 704/270; 704/254; 704/10; 704/257; 709/228; 709/230; 719/328
(58) Field of Classification Search .................. 704/235, 704/270, 270.1, 9, 243, 254, 10, 272, 252, 704/257; 709/228, 230; 719/328
See application file for complete search history.

(56) References Cited

U.S. PATENT DOCUMENTS

| | | | | |
|---|---|---|---|---|
| 4,829,576 A | * | 5/1989 | Porter | 704/235 |
| 4,914,704 A | * | 4/1990 | Cole et al. | 704/235 |
| 5,031,113 A | * | 7/1991 | Hollerbauer | 704/235 |
| 5,220,611 A | * | 6/1993 | Nakamura et al. | 704/278 |
| 5,355,472 A | * | 10/1994 | Lewis | 715/208 |
| 5,572,643 A | * | 11/1996 | Judson | 709/218 |
| 5,799,273 A | * | 8/1998 | Mitchell et al. | 704/235 |
| 5,960,447 A | * | 9/1999 | Holt et al. | 715/201 |
| 6,167,395 A | * | 12/2000 | Beck et al. | 1/1 |
| 6,170,011 B1 | * | 1/2001 | Macleod Beck et al. | 709/224 |
| 6,292,480 B1 | * | 9/2001 | May | 370/352 |
| 6,298,326 B1 | * | 10/2001 | Feller | 704/270 |

(Continued)

OTHER PUBLICATIONS

Fiuczynski et al., ( "The Design and Implementation of the IPv6/IPv4 Network Address and Protocol Translator", Proceedings of the USENIX Annual technical Conference, No. 98, New Orleans, LA, Jun. 1998, pp. 1-11.*

(Continued)

*Primary Examiner* — Vijay B Chawan
(74) *Attorney, Agent, or Firm* — Lee G. Meyer; Meyer & Associates, LLC

(57) ABSTRACT

A system is disclosed for facilitating speech recognition and transcription among users employing incompatible protocols for generating, transcribing, and exchanging speech. The system includes a system transaction manager that receives a speech information request from at least one of the users. The speech information request includes formatted spoken text generated using a first protocol. The system also includes a speech recognition and transcription engine, which communicates with the system transaction manager. The speech recognition and transcription engine receives the speech information request from the system transaction manager and generates a transcribed response, which includes a formatted transcription of the formatted speech. The system transmits the response to the system transaction manager, which routes the response to one or more of the users. The latter users employ a second protocol to handle the response, which may be the same as or different than the first protocol. The system transaction manager utilizes a uniform system protocol for handling the speech information request and the response.

17 Claims, 4 Drawing Sheets

U.S. PATENT DOCUMENTS

| | | | |
|---|---|---|---|
| 6,311,159 B1* | 10/2001 | Van Tichelen et al. | 704/275 |
| 6,434,526 B1* | 8/2002 | Cilurzo et al. | 704/270.1 |
| 6,449,588 B1* | 9/2002 | Bowman-Amuah | 703/21 |
| 6,748,361 B1* | 6/2004 | Comerford et al. | 704/275 |
| 6,970,935 B1* | 11/2005 | Maes | 709/230 |
| 7,137,126 B1* | 11/2006 | Coffman et al. | 719/328 |
| 7,529,675 B2* | 5/2009 | Maes | 704/270.1 |
| 7,558,730 B2* | 7/2009 | Davis et al. | 704/235 |
| 7,606,712 B1* | 10/2009 | Smith et al. | 704/270.1 |
| 2002/0143874 A1* | 10/2002 | Marquette et al. | 709/204 |
| 2002/0184373 A1* | 12/2002 | Maes | 709/228 |
| 2003/0101054 A1* | 5/2003 | Davis et al. | 704/235 |
| 2006/0041431 A1* | 2/2006 | Maes | 704/270.1 |
| 2007/0250317 A1* | 10/2007 | Davis et al. | 704/235 |

OTHER PUBLICATIONS http://www.cisco.com/univercd/cc/td/doc/cisicntwk/ito_doc/index.htm, Cisco Systems, Internetworking Technologies Handbook, Chapter 17 X.25 (pp. 1-10), Chapter 30, internet Protocols (pp. 1-16), and CHapter 25, Appletalk (pp. 1-22), 2000.*

Andrew S. Tanenbaum, Computer Networks, Prentice-HAll, Inc., 1981, pp. 7-21.*

* cited by examiner

SPEECH RECOGNITION AND TRANSCRIPTION AMONG USERS HAVING HETEROGENEOUS PROTOCOLS

CROSS-REFERENCE TO RELATED APPLICATIONS

The present application is a Continuation Application of U.S. Application Ser. No. 11/824,794 filed Jul. 3, 2007 for SPEECH RECOGNITION AND TRANSCRIPTION AMONG USERS HAVING HETEROGENEOUS PROTOCOLS, now U.S. Pat. No. 7,558,730.

BACKGROUND OF THE INVENTION

1. Field of the Invention

The present invention relates to electronic speech recognition and transcription, and more particularly, to processes and systems for facilitating electronic speech recognition and transcription among a network of users having heterogeneous system protocols.

2. Discussion of Related Art

There has long been a desire to have machines capable of responding to human speech, such as machines capable of obeying human commands and machines capable of transcribing human speech. Such machines would greatly increase the speed and ease with which people communicate with computers and with which they record and organize their words and thoughts.

Due to recent advances in computer technology and speech recognition algorithms, speech recognition machines have begun to appear and have become increasingly more powerful and less expensive. Advances have made it possible to bring large vocabulary speech recognition systems to the market. Such systems recognize a large majority of the words that are used in normal everyday dictation, and thus are well suited for the automatic transcription of such dictation.

Voice recognition has been used as a way of controlling computer programs in the past. But current voice recognition systems are usually far from foolproof, and the likelihood of their failing to recognize a word tends to increase with the size of the system's vocabulary. For this reason, and to reduce the amount of computation required for recognition, many speech recognition systems operate with pre-compiled artificial grammars. Such an artificial grammar associates a separate sub-vocabulary with each of a plurality of grammar states, provides rules for determining which grammar state the system is currently in, and allows only words from the sub-vocabulary associated with the current machine state to be recognized.

Such pre-compiled artificial grammars are not suitable for normal dictation, because they do not allow users the freedom of word choice required for normal dictation. But such artificial grammars can be used for commanding many computer programs, which allow the user to enter only a limited number of previously known commands at any one time. There are, however, many computer commands for which such pre-compiled artificial grammars are not applicable because they allow the user to enter words that are not limited to a small, predefined vocabulary. For example, computer systems commonly refer to, or perform functions on data contained in changeable data structures of various types, such as text files, database files, file directories, tables of data in memory, or menus of choices currently available to a user. Artificial grammars are often insufficient for computer commands which name an element contained in such a data structure, because the vocabulary required to name the elements in such data structures is often not known in advance.

The use of speech recognition as an alternative method of inputting data to a computer is becoming more prevalent as speech recognition algorithms become more sophisticated and the processing capabilities of modern computers increases. Speech recognition systems are particularly attractive for people wishing to use computers who do not have keyboard skills or need to transcribe in places where use of a keyboard is not possible or convenient.

Speech recognition and conversion to text is presently accomplished by ASR (automatic speech recognition) software sold commercially as a "shrink wrap" type product. These are workstation-based products that suffer from a number of drawbacks, and have a number of deficiencies, which prevent their use as standard transcription and form generation vehicles.

There are several speech recognition systems currently on the market that can operate on a desktop computer.

One such system is called DRAGON DICTATE. This system allows a user to input both speech data and speech commands. The system can interface with many different applications to allow the recognized text output to be directly input into the application, e.g., a word processor. This system uses the associated text and audio recording of the dictation which can be replayed to aid in the correction of the transcribed recognized text described in U.S. Pat. No. 5,960,447 to Holt et al. Another system, which is currently on the market, is the VIAVOICE by IBM. In this system the recognized text from the speech recognition engine is input into most major applications such as MS Word and audio data is stored. This system uses the associated text and audio recording of the dictation which can be replayed to aid in the correction of the transcribed recognized text described in U.S. Pat. No. 5,960,447 to Holt et al.

Networked application service providers (ASPs) would appear to be the most efficient way to utilize sophisticated speech recognition and transcription engines for large-scale users, especially in the professions. The networked system would comprise an application service provider that could interconnect application software to high accuracy central speech recognition and transcription engines. A barrier to implementation of such centralized systems, however, is that most businesses operate using their own internal "business" and/or system protocol, which include in many cases unique communications and application protocols. These protocols are unique to an entities system or organization, and are not universal in application. These systems are sometimes referred to as "legacy systems" and are very difficult to alter because they are the heart of the internal workings of a business, a computer system, or a hardware interface. For most network users, it is too costly, both in terms of equipment costs and disruptions in electronic communications, to replace a legacy system with a uniform "business" or system protocol merely to support network applications for speech recognition and transcription. Thus, most network systems are unavailable to legacy system users. It would therefore be advantageous to seamlessly interface network application software and enable powerful speech recognition/transcription engines to interface with legacy systems.

Legacy network users must also train employees to operate on a network where the operational commands and language used to communicate with another user can be unique for each user on the network, i.e., one user must, to some extent, understand another users internal entity system protocol. This can make even simple requests to another network user; say for a particular record form generated by transcription, a complex and time-consuming task. Thus, a large amount of skill and testing are needed to establish direct communications between the legacy or business system protocol of two different users. Therefore, a new user is forced to find ways to adapt its legacy system to the other legacy systems on the network, in order to interact with other network users' records and to transcribe seamlessly from one user to another. This is an expensive process both in terms of time and money. Some companies transact business over a public network, which partly resolves the issue. However, the use of a public network raises privacy concerns and does not address the heterogeneity of different internal entity protocols used by different entities in transacting information flow.

Computer databases that contain information from a number of users, including universal dictionaries and the like, are usually more efficient than a network of direct, point-to-point links between individual users. But databases suffer from significant inefficiencies in conducting communications between database users. Perhaps, most significantly, a single database rarely represents every user's interests, even when that database specializes in information on a particular field. Consequently, database users are forced to subscribe to a large number of database services, each having its own communication protocol that must be negotiated by every potential user. This is expensive cumbersome and slows down speed of information transfer.

Further, existing ASR systems can not incorporate broad, practical solutions for multi-user, commercial, business, scientific, medical, military, law enforcement and other network or multi-user applications, to name but a few. It is possible with existing ASRs to tailor a system to a specific requirement or specific set of users, such as a hospital or a radiology imaging practice only by customized implementations for each environment, very time consuming and difficult to maintain for future versions of the ASR technology and/or any application or device being used by the system.

Finally, existing systems are subject to revenue loss resulting from unauthorized use (sometimes referred to as "software piracy"). Unauthorized software use generally represents an enormous loss of revenue for licensors of software. Thus, in order to be commercially viable, systems must not only be able to track and bill for usage but also "lock down" the system when unauthorized use (pirating) occurs.

It would therefore be desirable to have a safe, secure, easy-to-use system to facilitate the exchange of speech (which includes spoken text and spoken and embedded commands) and information among users having heterogeneous and/or disparate internal system protocols. It would also be desirable that the system provides for automated speech recognition and transcription in a seamless manner regardless of the speaker or the subject matter of the speech, irrespective of the internal system protocol employed by an individual user.

SUMMARY OF THE INVENTION

The present invention provides a system for facilitating speech recognition and transcription among users employing heterogeneous or disparate entity system protocols. The system, which is secure and easy to use, provides seamless exchange of verbal and/or transcribed speech (which includes spoken text and spoken and embedded commands) and other information among users. User generated speech is seamlessly transcribed and routed, by the system, to a designated recipient irrespective of the disparity of the entity system protocol of each.

In the broad aspect, a system transaction manager receives a verified request from at least one of the system users. This request can be in the form of generated speech information to be transcribed and disseminated to other users on the System, or a request for previously transcribed speech and/or other information, such as a user profile. A speech information transcription request comprises generated speech (which includes spoken text and spoken and embedded commands) using a first protocol. The system transaction manager, which is in communication with a speech recognition and transcription engine, generates a formatted speech information transcription request in a uniform protocol and forwards it to the speech recognition and transcription engine. The speech recognition and transcription engine, upon receiving the formatted speech information transcription request from the system transaction manager, generates a formatted transcription of the speech in the form of a formatted transcribed response. The formatted transcribed response is transmitted to the system transaction manager, which routes the response to one or more of the users employing a second protocol, which may be the same as or different than the first protocol.

In one embodiment, the system transaction manager utilizes a uniform system protocol for handling the formatted speech information request and the formatted transcribed response. In another embodiment, Subscribers to the system (who may also be users) have identifying codes, which are recognizable by the system for authorizing a system transaction to create a job. In accordance with this embodiment, at least one Subscriber is required to be involved in a transaction comprising speech information transcription request and/or a formatted transcribed response.

The inventive system may optionally include application service adapters to generate a formatted request and/or response. A first user application service adapter communicates with one or more of the users and with the system transaction manager and generates a formatted request via a first protocol which may be a formatted speech information request from spoken text that the User produces or a request for previously transcribed spoken text from formatted speech information residual in the system. A second user application service adapter also communicates with one or more of the users and with the system transaction manager. The second user application service adapter is the same as or different than the first user application service adapter, and provides a designated user with a formatted transcribed response, which is compatible with a second protocol which may be the same as or different than the first protocol.

To accommodate yet another system protocol used by the speech recognition and transcription engine, a speech recognition service adapter communicates with the system transaction manager and the speech recognition and transcription engine to provide a designated engine with a formatted transcribed request, which is compatible with the engines and a response compatible with the managers protocol.

The present invention also provides a method of exchanging generated speech information and/or transcribed spoken text among users who may employ different user protocols. The method includes generating a speech information request, or a request for previously transcribed speech and/or other information through a first user protocol and conveying it to the transaction manager. The formatted speech information request is transmitted to the speech recognition and transcription engine via the system transaction manager through a speech recognition protocol compatible with the speech recognition and transcription engine. The method also includes generating a formatted transcribed response to the speech information request, using the speech recognition and transcription engine and transmitting the formatted transcribed response to a user via the system transaction manager and providing the user with a formatted transcribed response to the speech information request, or the request for previously transcribed speech and/or other information that is compatible with a second user protocol that may be the same as or different than the first user protocol.

In another aspect, of the present invention a method of exchanging transcribed speech among users having heterogeneous user protocols is provided. The method comprises the steps of generating a speech information request or a request for previously transcribed speech and/or other information obtained through a first user protocol generated using a first, user application service adapter. The method includes transmitting the speech information request to a speech recognition and transcription engine, which may have yet a different speech recognition protocol through a speech recognition service adapter via a system transaction manager and generating a formatted transcribed response to the speech information request using the speech recognition and transcription engine. The formatted transcribed response to the speech information request is transmitted to the system transaction manager via the speech recognition service adapter and the formatted transcribed response is returned to the transaction manager via the second service adapter. The system transaction manager using a second application service adapter conveys the formatted transcribed response to the user through a separate user application service adapter. The formatted transcribed response so transmitted is compatible with a second user protocol that may be the same as or different than the first user protocol.

DETAILED DESCRIPTION

System Nomenclature

Figure 1:
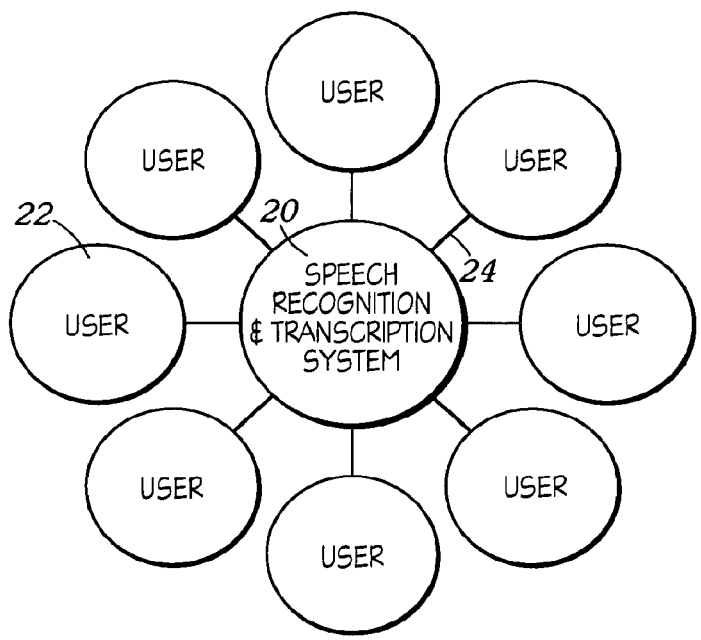
FIG. 1 is a schematic drawing showing communications among Users of a System for facilitating speech recognition and transcription.

The following terms and general definitions are used herein to describe various embodiments of a Speech Recognition and Transcription System ("System").

Applications Programming Interface (API): A set of services or protocols provided by an operating system to applications (computer programs) running under its control. The API may provide services or protocols geared to activities of a particular industry or group, such as physicians, engineers, lawyers, etc.

Application Service Adapter (ASA): An application layer within the Speech Recognition and Transcription System that provides an interface among Users, Speech Recognition and Transcription Engines, the System Transaction Manager and other System components by allowing a User's existing application and/or a System components application to communicate with the Transaction Manager. Thus, for example the ASA provides a bi-directional translation service between the User's Native Communications Protocols/Native Application Protocols and a uniform system protocol, e.g. TCP/IP, used by the System Transaction Manager.

Correctionist: A designated operation within the System for correcting the transcribed text produced by a Speech Recognition and Transcription Engine. Using its preferred application, the Correctionist operates within the workflow of the Speech Recognition and Transcription System such that after a Job is processed for transcription, it remains in a Correctionist Pool queue maintained by the System Transaction Manager awaiting processing by a Correctionist. Following correction, the Job is returned to the System Transaction Manager for transfer to a requesting User or the Recipient User or any number of other specified users. Other than having special permissions, the Correctionist interacts with the System in the same manner as a User. Correctionist permissions are granted on the basis of Correctionist Pools.

Correctionist Pool: A pool of Correctionists having particular programming applications within the System Transaction Manager. A Correctionist Pool maintains its own job queue. The programming applications restricts which Jobs are accepted for processing by the Correctionist pool. A system administrator or Pool Manager adds or deletes Correctionists based upon the programming applications. Depending on how the Pool is configured, the Pool Manager may be involved in every Job processed by the Correctionists.

Database: An indexed data repository, which may include previously transcribed Speech which can be requested.

Extensible Markup Language (XML), VOICE Extensible Markup Language (VXML) and Standardized Generalized Markup Language (SGML): Self-defining data streams that allow embedding of data, descriptions using tags, and formatting. XML is a subset of SGML.

Job: Refers to a specific Request tracked by a message format used internally by the Speech Recognition and Transcription System to operate on a group or set of data to be processed as a contained database that is modified and added to as the System processes the Speech Information Request. Jobs may include wave data, Rich Text Format (RTF) data, processing instructions, routing information and so on.

Native Application Protocol: A protocol, which a User employs to support interaction with Speech Information Requests and Responses.

Native Communications Protocol: A communications protocol that the User employs to support communication within its legacy system. For many transactions, a User employs the Native Communications Protocol and the Native Application Protocol to access its core processes, i.e., the User's Legacy Protocol.

Normalized Data Format: A uniform internal data format used for handling Speech Information Requests and Responses with System components within the Speech Recognition and Transcription System.

Passive User: A User who does not have authority to Request on the System, but can be a recipient.

Pre-existing Public Communication System: A communications link that is accessible to Users and can support electronic transmission of data. An example includes the Internet, which is a cooperative message-forwarding system linking computer networks worldwide.

Protocol: A group of processes that a User and/or an ASR employs to directly support some business process or transaction and is accessed using a Native Communications Protocol.

Real Time User: A User whose SIR transactions operate at the highest priority to allow for real-time transcription of speech or at least a streaming of the SIR. When the System Transaction Manager receives a real-time SIR, it immediately locates an available ASR engine capable of the request and establishes a bi-directional bridge whereby spoken and transcribed text can be directly exchanged between user and ASR engine in real time or near real time.

Recipient or Receiving User: A User that receives a transcription of a Speech.

Requester or Requesting User: A User that submits Speech for transcription or a request for transcribed Speech within the System.

Response to a Speech Information Request: A formatted transcription of formatted Speech. Formatting may refer to the internal representation of transcribed Speech within the System (data structure) or to the external representation of the transcribed Speech when viewed by Users (visual appearance) or to both.

Routing: The process of transferring speech data using System Protocol that can employ either PUSH technology or PULL technology, where PUSH refers to the Requestor initiating the transfer and PULL refers to the Recipient initiating the transfer.

Speech: Spoken text and spoken and embedded commands, which the System may transcribe or process. Spoken text generally refers to words that allow a User to communicate with an entity, including another User. Spoken commands generally refer to words having special meaning to the User and to one or more components of the System, which may include the System Transaction Manager and the Speech Recognition and Transcription Engine. Embedded commands generally refer to commands that the User's Native Application Protocol inserts during audio data capture, which may be acted upon by the System.

Speech Information Request (SIR): Formatted Speech, which can be acted upon by System components, including the System Transaction Manager. Formatting generally refers to the internal representation of dictated or "raw" Speech (data structure) which the System can manipulate.

Speech Recognition Service Adapter (SRSA): An ASA layer that communicates with the ASR engine through the combined vendor independent ASR interface/vendor specific ASR Interface. The adapter handles formatting the requested text received from the System Transaction Manager for ASR interface and the response text received from an ASR engine into or from a System protocol or a legacy protocol used by the User and/or the System Transaction Manager. Formatting includes such items as converting raw text to RTF, HTML, etc. interpreting and applying macro commands, filling in any specified forms or templates and/or protocol conversion.

Subscriber: An entity, whether a User or not, which is authorized to approve transactions on the System.

System Transaction Manager: A server application that provides a central interconnect point (hub) and a communications interface among System components and Users having desperate or heterogeneous protocols; and, an information router (or bridge or switch) within the Speech Recognition and Transcription System.

Speech Recognition and Transcription Engine: A process running on a computer that recognizes an audio file and transcribes that file to written text to generate a transcription of Speech.

Speech Recognition and Transcription Server (SRTS): A server application within the Speech Recognition and Transcription System, typically running on a separate computer and encompassing any number of automatic Speech Recognition and Transcription (ASR) Engines. The SRTS interfaces multiple ASR engines with other system components through pipelines. Each pipeline maintains a job queue from the Speech Transaction Manager through one or more SRSAs.

The SRSA typically includes two adapters, an Audio Preprocess Adapter and a Speech Recognition Service Adapter.

Updating a User Profile: A User Profile may be updated from documents, dictionaries, macros, and further user training.

User: An entity that uses services provided by the Speech Recognition and Transcription System. A User may also be a Subscriber.

User Identification (ID): A System identifier, which is used to uniquely identify a particular User and its legacy protocol.

User Profile: A data set generated by a user enrolling on a specific ASR engine, and required by an ASR engine to process speech recognition.

User Service Adapter: A specific Application Service Adapter that handles formatting and Routing of Speech Information Requests and Responses to elements of a User's Protocol within the Speech Recognition and Transcription System.

Workstation/workgroup: An application running on a separate computer and encompassing an ASR engine, and a User Service Adapter for communicating with the System Transaction Manager, for transferring and updating the User Profile. A Workstation application has the capability of dictating Speech into any application in real time or near real time. Workstations, configured into a Workgroup, linked to a System Transaction Manager, allow for sharing and updating a User Profile from any computer.

Overview

FIG. 1 is a schematic drawing showing communications among Users 22 of a Speech Recognition and Transcription System 20. Individual Users 22, having distinct legacy protocols, communicate with the Speech Recognition and Transcription System 20 via a communications link 24. Any User 22 may request transcription of spoken text and any User 22 may be the recipient of transcribed spoken text, including the User 22 requesting and receiving the transcription. As described in detail below, the Speech Recognition and Transcription System 20 includes a System Transaction Manager (see FIG. 5), which transfers information/spoken text, spoken commands, embedded commands, and the like, among Users, 22, and one or more Speech Recognition/Transcription Engines (see FIG. 6).

The System Transaction Manager may comprise more than one physical and/or functional element, and a multi-tiered System Transaction Manager may be practical in some applications. The System Transaction Manager communicates with at least one Application Service Adapter (see FIG. 3), which provides an interface between the System Transaction Manager and a protocol that a User 22 employs to generate spoken text and associated spoken and embedded commands. The Speech Recognition and Transcription System 20 may also include one or more User Application Service Adapters (see FIG. 3) that handle formatting and Routing of information between the Application Service Adapters and the Speech Transaction Manager. Communication links 24 include communication interface between the Users 22 and the System 20, which can be, for example, a public communications system, such as the Internet. Each User 22 has a System ID, for authentication and identification purposes as fully explained below. Preferably, at least one User in any transaction (Job) must be a Subscriber to the System. In this embodiment the Subscriber is an authorizing agent that permits the transaction access to the System 20.

Speech to be transcribed is generated primarily as spoken text. The spoken text, which can include spoken and/or imbedded commands is captured and obtained using any well-known methods and devices for capturing audio signals.

For example, spoken text can be acquired using a microphone coupled to an A/D converter, which converts an analog audio signal representing the spoken text and commands to a digital signal that is subsequently processed using a dedicated Digital Signal Processor (DSP) or a general-purpose microprocessor. For a discussion of the acquisition of audio signals for speech recognition, transcription, and editing, see U.S. Pat. No. 5,960,447 to Holt et al., which is herein incorporated by reference in its entirety and for all purposes.

To produce a transcription of the User generated Speech, a User Application Service Adapter generates a Formatted Speech Information Request, which comprises formatted spoken text and typically includes formatted spoken and embedded commands, from spoken text obtained using a User's 22 existing (legacy) protocol. With the help of a first User Application Service Adapter, the System Transaction Manager transfers the Speech Information Request, to an appropriate Speech Recognition and Transcription Engine through an ASR Application Service Adapter, if necessary to communicate with the Speech Recognition and Transcription Engine. The Speech Recognition and Transcription Engine generates a Response to the Speech Information Request, which includes a formatted transcription of the spoken text. Using the ASR Application Service Adapter the Response is transferred to the System Transaction Manager. With the help of a User Service Adapter, which may be, the same or different than the first, the System Transaction Manager subsequently transfers the Response to a User Application Service Adapter, which provides one or more of the Users 22 with a transcription that is compatible with its particular (legacy) protocol. The generating User 22 and the receiving User 22 may be the same User or a different User or a number of Users may receive the Response. Likewise the Request may be for Speech, previously transcribed and stored in a Systems Database. To effectively transfer the Speech Information Requests and Responses between the User Application Service Adapters and the ASR Application Service Adapter for the Speech Recognition and Transcription Engines, the System Transaction Manager employs a uniform or "system" protocol capable of handling Requests and Responses expressed in a standard or normalized data format. The only requisite for this protocol is that it be convertible into the User's and/or the Speech Recognition and Transcription Engine protocol.

As set forth above, the User and/or Application Service Adapters are the same when the User 22 requesting a transcription of spoken text also receives the transcribed spoken text, provided the application recording the Speech is the same as the application receiving the transcribed spoken text. In many cases, a User Application Service Adapter and/or a User Service Adapter will reside on the Users' 22 Workstation/workgroup computer system. In such cases, the Speech Recognition and Transcription System 20 employs physically different User Application Service Adapters and User Service Adapters to exchange information among two Users 22 even though they may use similar protocols.

Figure 2:
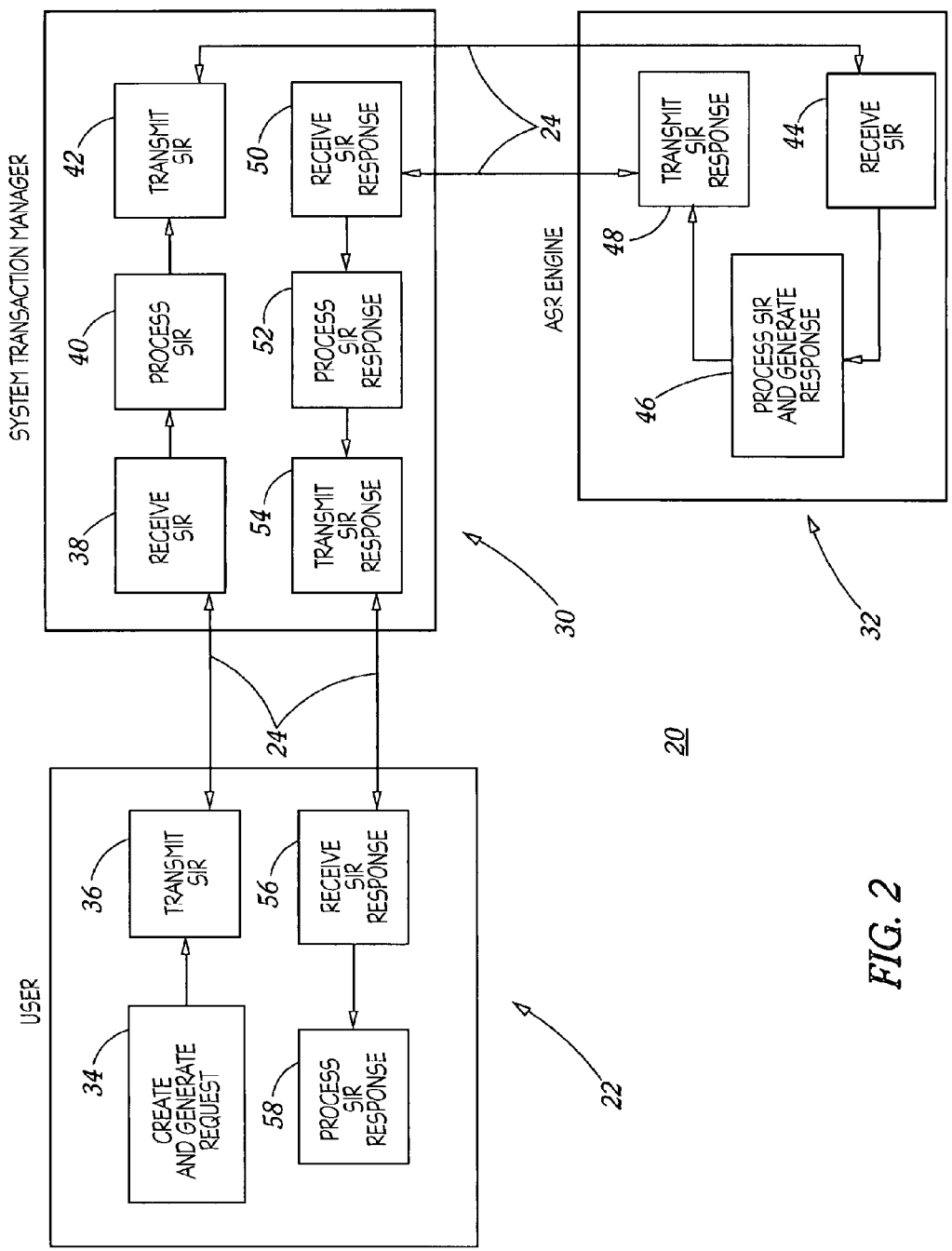
FIG. 2 is a schematic drawing showing processing and flow of information among Users and components of the System shown in FIG. 1.

FIG. 2 is a block diagram showing processing and flow of information among Users 22 and components of the Speech Recognition and Transcription System 20 of FIG. 1. For clarity, the System 20 shown in FIG. 2 includes a representative User 22, System Transaction Manager 30, Speech Recognition and Transcription Engine 32, and communications links 24. It should be understood, however, that the System 20 would ordinarily include multiple Users, Speech Recognition and Transcription Engines, and communications links, and would in certain embodiments include more than one System Transaction Manger i.e. a tiered system with System Transaction Mangers communicating among themselves in a tiered arrangement. The physical location of the various functions is not critical, and is chosen for expediency, economics, convenience and the like. Users 22 normally access the System Transaction Manager 30 by sending a Speech Information Request or a Request for stored Speech information that includes the User's 22 identification (ID). In addition, preferably, each transaction includes a Subscriber's ID, whether the Subscriber actually requests or receives information relating to that transaction.

Turning to FIG. 2, the System 20 includes processes that enable a User 22 to generate 34 and to transmit 36 the Speech Information Request to the System Transaction Manager 30. The System Transaction Manager 30 receives 38, processes 40, and transmits 42 the Request to the appropriate Speech Recognition and Transcription Engine 32. The Speech Recognition and Transcription Engine 32 includes processes for receiving 44 the Request, for processing and generating a responds 46 to the Request (e.g., for transcribing the Speech), and for transmitting 48 the Response (e.g., transcribed Speech) back to the System Transaction Manager 30. The System Transaction Manager 30 receives 50, processes 52, and transmits 54 the Response to the User 22, which, may access System 20 processes that enable it to receive 56 and to process 58 the Response to the Speech Information Request. This is all facilitated by use of authentication routines, certain protocol adapters, and User Profiles as will be further explained.

Generation of the Speech Information Request

To initiate transcription of speech, the User 22 shown in FIG. 2 generates 34 a Speech Information Request (SIR), which includes formatted spoken text, and may include formatted spoken and embedded commands. Alternatively, the SIR can comprise a request for previously transcribed and stored information. As noted earlier, the System 20 preferably utilizes a Normalized Data Format, which can be understood by the System Transaction Manager 30. The Speech Information Request includes an informational header and a formatted message portion. The header, the message portion, or both the header and the message portion may contain system Routing information, which includes, for example, the Requesting User's 22 identification and meta addresses of a Recipient User 22, or of a particular Speech Recognition and Transcription Engine 32, etc. The System Transaction Manager 30 uses the identification information to ensure that the User 22 is authorized to use the System 20 and, preferably, simultaneously verifies that a Subscriber has authorized the transaction. The message portion ordinarily includes formatted spoken text, and if present, formatted spoken commands and formatted embedded commands.

Generation of the Speech Information Request 34 is by dictation/spoken text, spoken and embedded commands, which are produced using an existing protocol. Alternatively, the generated Request for Speech information stored on a Database in the System. The generation is a language-independent configurable set of services written in a high-level language such as C, C++, Java, and the like, which allows a User 22 to "plug" its existing application software and hardware into the System 20 to generate 34 the Speech Information Request. A User 22 employing a desktop computer having, for example, an Internet connection, which allows access to the System Transaction Manager 30, may generate 34 the Speech Information Request in Real Time or offline for later submission as a batch Request. Likewise, the User 22 may employ a personal digital assistant (PDA), such as a World Wide Web-enabled cellular phone or a hand-held device running POCKET PC OS, PALM OS, etc., which provides for example a wireless connection to the System Transaction Manger 30. PDA Users 22 may generate 34 the request in Real Time, or generate 34 the request offline for later submission as a batch Request. For PDA Users 22 the Request would likely include meta addresses containing only minimum Routing information for the Recipient User 22, Speech Recognition and Transcription Engine 32, etc., in which case the System Transaction Manager 30 would supply the balance of the Routing information.

Transmission of the Request to the System Transaction Manager

Once the Application Service Adapter generates 34 the Speech Information Request, the System 20 prepares for transmitting 36 the Request to the System Transaction Manager 30. Such preparation may include applying the User 22 identification to the Request, attaching the Subscribers authentication, encrypting the Request, and attaching Routing information to the Request, such as meta addresses of the Recipient User 22 and of the Speech Recognition and Transcription Engine 32. Additional preparation may include appending a User Profile to the Speech Information Request, which the Speech Recognition and Transcription Engine 32 uses to increase the accuracy of the Speech recognition. The content of the User Profile is specific to an individual speaker and may vary among Speech Recognition and Transcription Engines 32, but typically includes information derived from corrections of past speech recognition and transcription sessions. In other embodiments, the System Transaction Manager 30 or Speech Recognition and Transcription Engine 32 may retrieve a copy of the User's 22 profile from a storage location inside or outside of the System 20 boundaries. A Workstation/workgroup may contain a User Profile and/or an Updated User Profile. Additionally, a User may transmit an Updated User Profile to the System Transaction Manager 30, for subsequent use with specific User Requests.

The System 20 transmits 36 the Request to the System Transaction Manager 30 via the communications link 24. The System 20 may use any type of communication system, including a Pre-existing Public Communication System such as the Internet, to connect the Requesting User 22 with the System Transaction Manager 30. For example, the Application Service Adapter 80 (FIG. 3) may generate the Speech Information Request in a Normalized Data Format using Extensible Markup Language (XML), which is transmitted 36 to the System Transaction Manager via Hypertext Transfer Protocol (HTTP), Transmission Control Protocol/Internet Protocol (TCP/IP), File Transfer Protocol (FTP), and the like. Other useful data transmission protocols include Network Basic Input-Output System protocol (NetBIOS), NetBIOS Extended User Interface Protocol (NetBEUI), Internet Packet Exchange/Sequenced Packet Exchange protocol (IPX/SPX), and Asynchronous Transfer Mode protocol (ATM). The choice of communication protocol is based on cost, response times, etc.

Receipt of the Request by the System Transaction Manager

As can be seen in FIG. 2, the System Transaction Manager 30 receives 38 the Speech Information Request from the User 22 via the communications link 24. Receipt 38 of the Speech Information Request activates the System Transaction Manager 30 and triggers certain functions. For example, if the Request is not in the appropriate format, the System Transaction Manager 30 translates the Request into the System format, for example, Normalized Data Format. If necessary, the System Transaction Manager decrypts the Request based on a decryption key previously supplied by the User 22. The System Transaction Manager 30 also logs the receipt of the Speech Information Request, and sends a message to the User 22 via the communications link 24 confirming receipt of the Request. In addition, the System Transaction Manager 30 authenticates the User 22 ID, verifies a Subscriber authorization, assigns a Transaction or Job ID to keep track of different Requests, and validates the Request.

To simplify validation and subsequent processing 40 of the Request, the System Transaction Manager 30 creates a data record by stripping off the informational header and by extracting Speech data (digitized audio) from the formatted message portion of the Request. The resulting data record may comprise one or more files or entries in a database, which allows the System Transaction Manager 30 to easily process the Request. The data record, along with any other database entries that the System 20 uses to process the Request is called a Job. Thus, a Job may refer to the specific message format used internally by the Speech Recognition and Transcription System 20 (e.g., wave data, rich text format data, etc.) but may also refer to processing instructions, Routing information, User Profile and so on.

During validation of the Request the System Transaction Manager 30 examines the data record to ensure that the Request meets certain criteria. Such criteria may include compatibility among interfaces which permit information exchange between the User 22 and the System Transaction Manager 30. Other criteria may include the availability of a User Profile and of a compatible Speech Recognition and Transcription Engine 32 that can accommodate digital audio signals which embody the spoken text and commands. Additional criteria may include those associated with the authentication of the User 22, such as the User's 22 status, whether the User 22 has the requisite permissions to access System 20 services, and so on.

If System Transaction Manager 30 is unable to validate the Speech Information Request, it logs the error and stores the Request (data record) in a database. Additionally, the System Transaction Manager 30 returns the Request to the User 22, and informs the User 22 of the validation criteria or criterion that the Request failed to meet.

Processing of the Request by the System Transaction Manager

Following receipt 38 of the Speech Information Request, the System Transaction Manager 30 processes 40 the validated Request prior to transmitting 42 it to the Speech Recognition and Transcription Engine 32. As part of the processing 40 function, the System Transaction Manager 30 stores the Request (data record and header information) as an entry in an appropriate Job bin or bins. A process running under the System Transaction Manager 30 examines the Request to determine the appropriate Job bin. This determination may be based, in part, on processing restrictions imposed by the Speech (e.g., subject matter of spoken text, command structure, etc.), which limit the set of Speech Recognition and Transcription Engines 32 that are able to transcribe the Speech. API interface criteria are also used to determine the ASR Job bin appropriate for a particular Request.

Bins are further subdivided based on priority level. The System Transaction Manager 30 assigns each Request or Job a priority level that depends on a set of rules imposed by a System 20 administrator. An individual Request therefore resides in a Job bin until a Speech Recognition and Transcription Engine 32 requests the "next job." The System Transaction Manager 30 releases the next job having the highest priority from a Job bin which contains Requests that can be processed by the requesting Speech Recognition and Transcription Engine 32. A Real Time User's or SIR transactions operate at the highest priority to allow for real-time or near real time transcription of speech. The System Transaction Manager immediately locates an available ASR engine capable of the request and establishes a bi-directional bridge whereby spoken and transcribed text can be directly exchanged between user and ASR engine for a real-time, or near real time, SIR.

Processing 40 also includes preparing the Request for transmission 42 to the Speech Recognition and Transcription Engine 32 by parsing the information header of the Request. The header may include meta addresses and other Routing information, and typically provides information concerning the content of the formatted message e.g. different core components (substorages) that make up a Request or Job, which can be added or removed without breaking a process acting on the Job. Among the core components are "Job Information," "Job Data," and "User settings," which contain, respectively, Request Routing information, digitized audio, and information on how to process the Request. Priorities and User Profiles are also included.

The System Transaction Manager 30 may also execute operations or commands, which may be embedded in the Speech Information Request and are triggered during processing 40. To do so, the System Transaction Manager 30 employs an engine, which processes the data record and information header in accordance with a User 22 supplied set of rules. When certain conditions in the rules are met, the System Transaction Manager 30 executes actions associated with the conditions. Examples of actions include Updating User Profile, adding alternative Routing instructions, adding the request to a Database, and so on.

Figure 3:
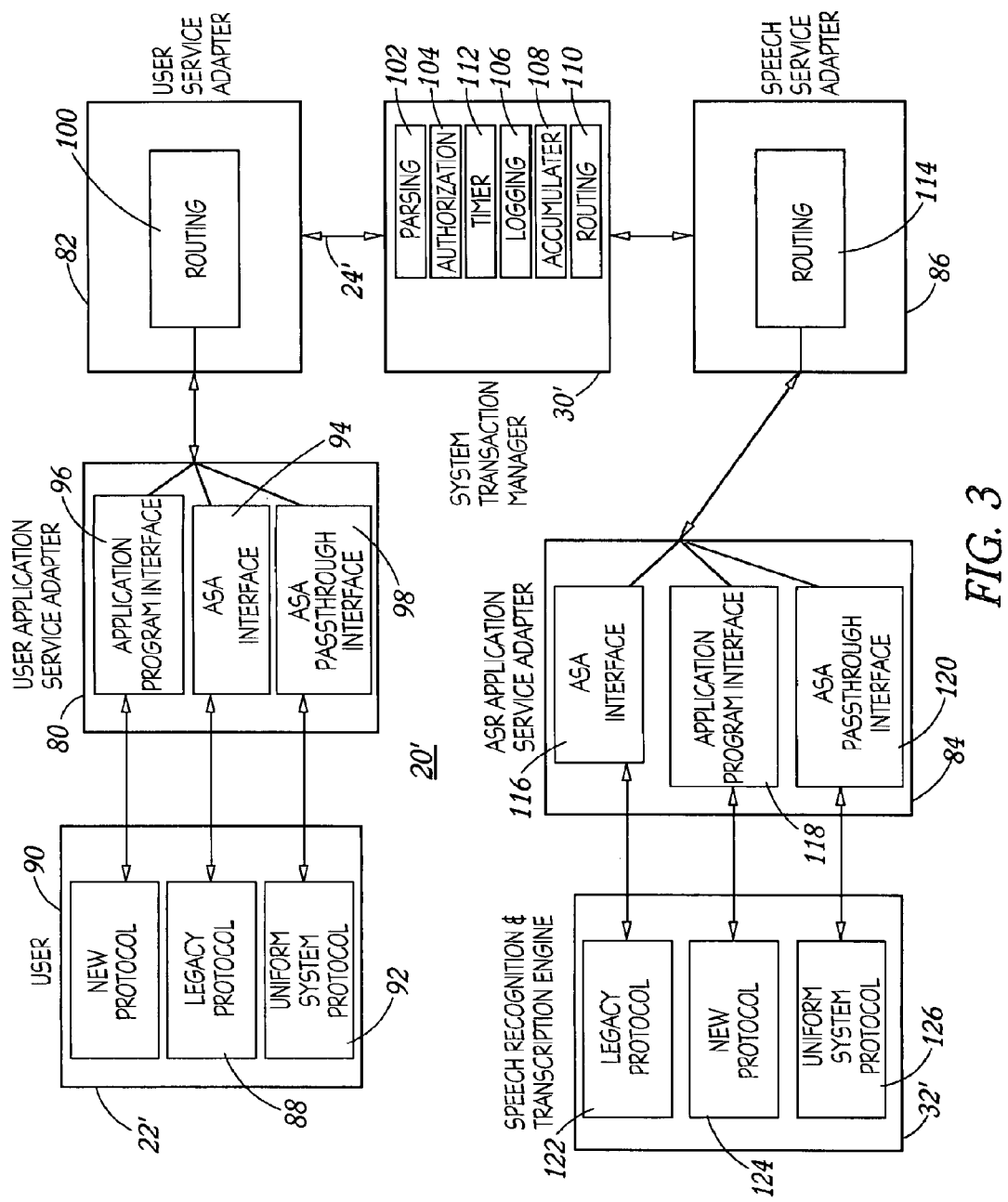
FIG. 3 is a schematic drawing of another embodiment of a System for facilitating speech recognition and transcription.

Transmission of the Request from the System Transaction Manager to the Speech Recognition and Transcription Engine Once the Speech Information Request has been processed 40, the System Transaction Manager 30 transmits 42 the Request (data record User Profile and perhaps informational header) to the appropriate Speech Recognition and Transcription Engine 32 via the communications link 24. If necessary, the System Transaction Manager appends the User 22 and Transaction Identifications to the Request and prepares the Request for transmission to the appropriate Speech Recognition and Transcription Engine 32. If the Engine 32 can process the Request when expressed in Normalized Data Format, then little or no preparation is necessary. As shown in FIG. 3, If the Engine 32 cannot, then the System 20 may employ a Speech Service Adapter 86 and/or an ASR Application Service Adapter 84 to provide an interface between the System Transaction Manager 30 and the Speech Recognition and Transcription Engine 32. The Speech Service Adapter 86 may reside within the boundaries of the System Transaction Manager 30 or the Speech Recognition and Transcription Engine 32.

Following preparation of the Request, the System Transaction Manager 30 transmits 42 the Request to the Speech Recognition and Transcription Engine 32 via the communications link 24 and using an acceptable communication protocol, such as HTTP, TCP/IP, FTP, NetBIOS, NetBEUI, IPX/SPX, ATM, and the like. The choice of communication protocol is based on cost, compatibility, response times, etc.

Receipt of the Request by the Speech Recognition and Transcription Engine

The System Transaction Manager 30 transmits 42 the Speech Information Request to the Speech Recognition and Transcription Engine 32, which has authority to access any data needed to respond to the Request, i.e. to transcribe spoken text, execute spoken commands, and the like. The additional data may include the requisite User Profile and a macro database, which includes a set of User 22 defined or industry specific instructions that are invoked by word or word-phrase commands in the Speech. Further, word or embedded commands may trigger macros in the Engine to specify text and/or formatting. The additional data may be transmitted 42 along with the Request as part of the Job, or may reside on a Speech Recognition and Transcription Server (FIG. 4) along with the Engine 32.

Receipt 44 of the Request activates the Engine 32 (or Server) which logs and authenticates the Request and queries the Request (data record) to determine its format. As noted above, if the Engine 32 can process the Request when expressed in Normalized Data Format, then the Request is sent to the Engine 32 for processing and generation of the Response. If the Engine 32 cannot, then the System 20 may employ one or more Speech Application Service Adapters (see FIG. 3) to provide an interface between the System Transaction Manager 30 and the Speech Recognition and Transcription Engine 32. In either case, the System 20 stores the Request (data record) and any other Job information on the Speech Recognition and Transcription Server for processing the request and generating the response 46. Prior to processing the request and generating the response 46, the System 20 sends a message to the System Transaction Manager 30 via the Communications Link 24 acknowledging receipt 44 of the Request.

Figure 6:
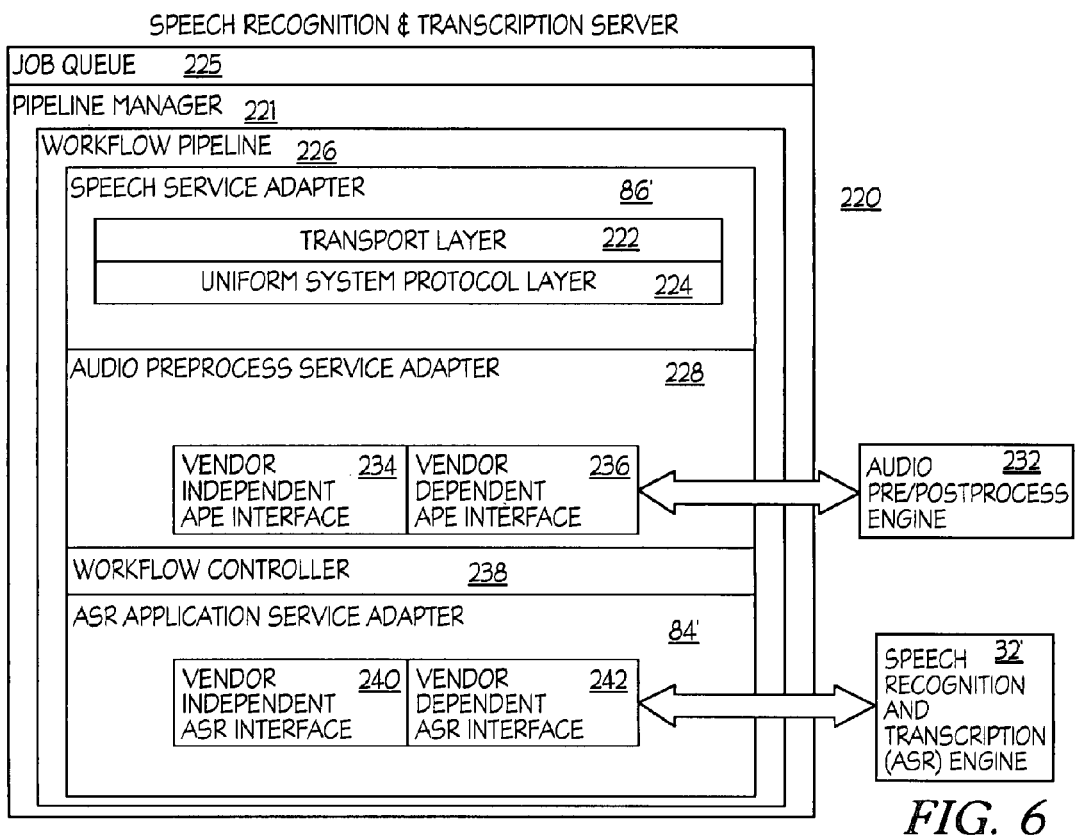
FIG. 6 is a schematic drawing of a Speech Recognition and Transcription Server.

During processing the request and generating the response 46, the Engine 32 ordinarily accesses local copies of the User Profile and macro database, which is stored on the Speech Recognition and Transcription Server 220 (see FIG. 6.) As noted above, the System Transaction Manager 30 may provide the requisite User Profile and macro database during receipt 44 of the Speech Information Request. Alternatively, the Engine 32 may access local copies of the User Profile and macro database available from processing the request and generating the response 46 earlier User 22 Requests. The locally cached User Profile and macro database may no longer work properly with the latest Request, as evidenced, say, by invalid version identifiers. In such cases the Engine 32 (or Server 220) may request an Updated User Profile and the macro database from the System Transaction Manager 30 or if instructed directly from the User Workstation/workgroup.

Processing of the Request and Generation of the Response by the Speech Recognition and Transcription Engine Following receipt 44 of the Speech Information Request, the Speech Recognition and Transcription Engine 32 processing the request and generating the response 46 to the Request. The Response comprises a formatted transcription of the Speech, where "formatted" may refer to the internal representation of the transcribed Speech within the System 20 (i.e., its data structure) or to the external representation of the transcribed Speech (i.e., its visual appearance) or to both. The System 20 typically controls the external representation of the transcribed Speech through execution of transcribed spoken commands or through execution of embedded commands that the System Transaction Manager 30, the ASR (Speech Recognition and Transcription) Engine 32, etc. extract from the Speech during processing 40, 46. In addition, the System 20 ordinarily accesses the instructions associated with the commands from the macro database.

The Speech Recognition and Transcription Engine 32 transcribes the Speech and generates the Response. Like the Request, the Response comprises a formatted message portion, which contains the transcribed Speech, and an information header, which contains Routing information, a description of the message format, Transaction ID and so on. Once the Response has been generated, the Speech Recognition and Transcription Engine transmits 48 the Response to the System Transaction Manager 30 via the communications link 24.

As shown in FIG. 3, if the Engine 32 cannot write the Response in Normalized Data Format, an ASR Application Service Adapter 84 and/or a Speech Service Adapter 86 generates the Response from a transcription produced using the Engine 32 existing protocol. Once the Response has been generated, it is queued for transmission to the System Transaction Manager 30.

Transmission of the Response from the Speech Recognition and Transcription Engine to the System Transaction Manager As shown in FIG. 2, Following processing the request and generating the response 46, the Speech Recognition and Transcription Engine 32 transmits 48 the Response to the System Transaction Manager 30 via the communications link 24 using an acceptable communication protocol, such as HTTP, TCP/IP, FTP, NetBIOS, NetBEUI, IPX/SPX, ATM, and the like. The choice of communication protocol is based on cost, compatibility, response times, etc.

Receipt and Processing of the Response by the System Transaction Manager

The System Transaction Manager 30 logs its receipt 50 of the Response and sends an acknowledgment to the Speech Recognition and Transcription Engine 32 (or Server 220) via the Communications Link 24. To prepare for transmission 54 of the Response to Recipients designated in the original Request, the System Transaction Manager 30 may perform other processing 52 which is associated with error correction, addressing, etc. For example, the System Transaction Manager 30 may compare the Transaction ID of the Response against Transaction IDs of the Requests in its database to verify Routing information for the Requesting User 22 and other intended User Recipients of the Response.

In addition, the System Transaction Manager 30 may place the Response or Job in a Correctionist Pool queue to await processing by a Correctionist (not shown), which is a member of the Correctionist Pool. As noted above, the Correctionist is a System Component that the System Transaction Manager 30 provides with special permissions for correcting the transcribed Speech produced by the Speech Recognition and Transcription Engine 32. The Correctionist uses an application of its choosing to correct the transcription, and has access to the formatted message portion of the Request. Following correction, the Job is returned to the System Transaction Manager 30 for transmission 54 to the Requesting User 22 or to other User Recipients.

Following correction or other processing 52, the System Transaction Manager 30 notifies the Requesting User 22 and/or other Receiving Users that a Response to the Speech Information Request is available. The System Transaction Manager 30 ordinarily notifies the Recipient or Receiving User 22 using electronic messaging via the Communications Link 24, but in general, may notify the User 22 by any technique specified by the Requesting User 22 or the Recipient or Receiving User. In any case, the Response remains as a record in a database maintained by the System 20 until archived. The Response so maintained may be accessed by any authorized User at any time and comprises a separate Job.

Transmission of the Response to the Requesting User, Designated Recipients, or Both Following any processing 52, the System Transaction Manager 30 transmits 54 the Response to the Speech Information Request to the Requesting User 22 and/or to any other Recipients designated in the Request, including non-Requesting Users and Passive Users. If necessary, the System Transaction Manager appends the User 22 ID and any additional Routing information, and transmits 54 the Response via the Communications Link 24 using an appropriate protocol as described above for other System 20 processes 36, 42, 48.

Receipt of the Response by the Designated Recipients, Including the Requesting User The System Transaction Manager 30 transmits 54 the Response to the intended Recipients, which usually include the Requesting User 22 and, optionally or alternatively, non-requesting Users 22 and Passive Users 22. If the Recipient can handle a Response expressed in the Normalized Data Format or if the Response is expressed in a format that is compatible with the Recipient's existing protocol, then the Recipient forwards the Response on for processing 58. As seen in FIG. 3, if the format of the Response is incompatible with the Recipient's system, then the System 20 may employ a User Application Service Adapter 80 to provide an interface between the System Transaction Manager 30 and the Recipient. Ordinarily, the Requesting User 22 and any non-requesting Users or Passive Users 22 will employ User Application Service Adapters that reside on their respective legacy systems. In contrast, Passive Users will likely employ User Application Service Adapters 80 that reside within the boundaries of the System Transaction Manager 30. In the latter case, the Recipient would receive 56 a Response from the System Transaction Manager 30 that is compatible with the Recipient's existing legacy system. Wherever the Application Service Adapter resides, the Recipient usually sends a message to the System Transaction Manager 30 via the Communications Link 24 acknowledging receipt 56 of the Response.

Processing of the Response by the Designated Recipients, Including the Requesting User After receiving 56 a compatible Response, the Requesting User 22 (or any Recipient) may process 58 the Response as necessary. Any processing 58 will depend on the particular needs of the Requesting User 22 or Recipient, and therefore may vary significantly among Recipients. Typical processing 58 includes error correction, formatting, broadcasting, computation, and so on.

Speech Recognition and Transcription System Utilizing Various Native Application Protocols FIG. 3, which has been briefly referred to previously, shows a block diagram of an embodiment of the Speech Recognition and Transcription System using both service adapters and routing adapters which can comprise functionality of the User or the Speech Recognition and Transcription Engine and/or the System Transaction Manager. The System includes a User 22', which communicates, at least indirectly, with a System Transaction Manager 30' and a Speech Recognition and Transcription Engine 32'. Like the embodiment, shown in FIG. 2, the System 20' would likely include multiple Users including Passive Users, Requesting Users and/or Receiving Users and Speech Recognition and Transcription Engines, and in some cases, would include a plurality of System Transaction Managers. As described in more detail below, the User 22' communicates with the System Transaction Manager 30' through a User Application Service Adapter 80 and a User Service Adapter 82.

Similarly, the Speech Recognition and Transcription Engine 32' communicates with the System Transaction Manager 30' through a ASR Application Service Adapter 84 and a Speech Service Adapter 86.

The User 22' who may initiate the transaction as a Requesting User, as shown in FIG. 3 may utilize a Legacy Protocol 88, a New Protocol 90, or a Uniform System Protocol 92, which is compatible with the Normalized Data Format utilized by the System Transaction Manager 30'. When using the Legacy Protocol 88, the User 22' communicates with an ASA Interface 94 in much the same manner as the System 20 User 22 of FIG. 2. However, a User 22', employing the New Protocol 90, communicates with an Application Program Interface 96, which, besides providing an interface between the User 22' and the System Transaction Manager 30', also allows the User 22' to access services that an operating system makes available to applications running under its control. The Application Program Interface 96 may thus provide services (e.g., automatic generation of insurance forms, engineering design templates, pleadings, etc.) geared to activities of a particular industry or group, such as physicians, engineers, lawyers, etc.

Like the System Transaction Manager 30', the Uniform System Protocol 92 processes information expressed in the Normalized Data Format. Therefore, an ASA Interface 94, which links the Uniform System Protocol 92 with the User Service Adapter 82 and the System Transaction Manager 30', provides minimal translation services, and typically simply validates any Speech Information Request or Response. It should be understood that a User 22' would ordinarily employ only one of the protocols 88, 90, 92. Likewise, the Application Service Adapter 80 would ordinarily have only one Interface 94, 96, 98 depending on the User's 22 choice of Protocol 88, 90, 92.

As with the embodiment shown in FIG. 2, the System 20' depicted in FIG. 3 provides speech recognition and transcription services using Speech Information Requests and Responses. To initiate transcription of Speech, a Requesting User 22' thus generates a Speech Information Request using the Legacy Protocol 88, the New Protocol 90, or the Uniform System Protocol 92. For example, the Requesting User 22' may create a Speech Information Request, which includes formatted spoken text and perhaps formatted spoken and embedded commands, using its Legacy Protocol 88 which employs a Native Application Protocol 154 and a Native Communications Protocol 156 (see FIG. 4).

In addition to providing Speech for transcription, the Request may include meta addresses or specific addresses of the Speech Recognition and Transcription Engine 32 and any Recipients of the Response. Any transaction among the System Transaction Manager 30', Requesting User 22', Engine 32' or Recipient Users 22', may be synchronous or asynchronous. However, if the Protocol 88, 90, 92 issues Requests in an asynchronous manner, it will direct the System Transaction Manager 30' to provide a Job or transaction ID. Since the Protocols 88, 90, 92 may issue Requests differently, the addresses and the Job ID, which is assigned by the System Transaction Manager 30', are often contained in the Request's informational header, but may also be found in the formatted message portion of the Request.

Continuing with the description, once the Requesting User 22' creates the Speech Information Request using its Legacy Protocol 88, it transmits the Request to the ASA interface 94 which transforms the Request so that it adheres to the System Transaction Manager's Uniform System Protocol, which handles Requests and Responses expressed in the Normalized Data Format. As discussed above, the transformed Speech Information Request includes a formatted informational header and a formatted message portion. The ASA Interface 94 may generate Requests using any suitable language, including for instance XML, as long as the resulting Request is compatible with the Uniform System Protocol utilized by the System Transaction Manager 30'.

As shown in FIG. 3, following transformation of the Speech Information Request, the Application Service Adapter 80 forwards the Request to the User Service Adapter 82. A Routing process 100 within the User Service Adapter 82 forwards the Request to the System Transaction Manager 30' over a communications link 24' (e.g., TCP/IP link). The Routing process 100 within the User Service Adapter 82 does not operate on information in the header or data portions of the Request destined for the System Transaction Manager 30'. The transport mechanism used by the Routing process 100 is the speech transport protocol (STP) used by the System Transaction Manager. STP is a transport protocol that operates over the underlying transport protocol (e.g. TCP/IP).

Once the System Transaction Manager 30' receives the Request, a parsing process 102 obtains addresses provided in the Request, which allows the System Transaction Manager 30' to identify, among other things, the targeted Speech Recognition and Transcription Engine 32'. When the parsing process 102 obtains addresses of multiple Engine types, the System Transaction Manager 30' may spawn duplicate Requests, each corresponding to one of the targeted Speech Recognition and Transcription Engine types. In this way the Job portions can proceed simultaneously. Other information, such as the selected language, vocabulary, topic, etc further limits which specific Engines can respond to the Request. If the Request includes a Job ID, the System Transaction Manager 30' logs the Job ID and addresses of the targeted Speech Recognition and Transcription Engines into a session control table to ensure that the Engines respond to the Request within a specified time. Priorities are also assigned such that Real Time Users are linked such that spoken and transcribed text can be directly exchanged between the Requesting User and ASR engine. If the Request does not have a Job ID, the parsing process 102 assigns a new Job ID and enters it in the session control table.

Following parsing of the addresses, the System Transaction Manager 30' forwards the Request (or Requests) to an authorization process 104. By comparing information in the Request with entries in a lookup table, the authorization process 104 verifies the identities of the Requesting User 22' and other Recipients (if any), the identities of their Protocols, and the identities of the Speech Recognition and Transcription Engine 32' or Engines as well as the Subscriber authorizing the transaction.

In conjunction with the authorization process 104, the System Transaction Manager 30' dispatches the Request to a logging process 106, which logs each Request. If the authorization process 104 determines that a Request has failed authorization for any number of reasons (lack of access to the Engine 32, invalid Recipients, unauthorized Requester, etc.), the logging process 106 notes the failure in the session control table and notifies an accumulator process 108. The accumulator process 108 keeps track of the original Request and all duplicates of the original Request. After the Request is logged, it passes to a Routing process 110, which directs the Request to the Speech Service Adapter 86, which is associated with the targeted Speech Recognition and Transcription Engine 32'.

When the original Request designates multiple Speech Recognition and Search Engines, the Routing process 110 directs the duplicate Requests to the appropriate Speech Service Adapters 86 associated with the Engines. The Routing process 110 examines the address of the addressee in the Request and then either routes (push technology) the Requested Information to the appropriate Speech Service Adapter(s) 84 using the Speech Recognition/Transcription Engine 32' address in the header, or places the Request into a prioritized FIFO queue where it waits for an engine of the designated type to Respond by retrieving the request (pull technology). Additionally, the Routing process 110 signals a timer process 112, which initiates a countdown timer for each Request. In either case the Jobs to be transcribed are cued and taken in priority.

A Routing process 114 within the Speech Service Adapter 86 directs the Request to an appropriate Interface 116, 118, 120 within the ASR Application Service Adapter 84. The choice of Interface 116, 118, 120 depends on whether the Speech Recognition and Transcription Engine 32' utilizes a Legacy Protocol 122, a New Protocol 124, or a Uniform System Protocol 126, respectively. As noted above with respect to the Requesting User's 22 Protocols 88, 90, 92, the Speech Recognition and Transcription Engine 32', and the Server that supports the Engine 32', would ordinarily employ only one of the Protocols 122, 124, 126. Similarly, the ASR Application Service Adapter 84 would ordinarily have only one Interface 116, 118, 120, depending on the Protocol 122, 124, 126 utilized by the Speech Recognition and Transcription Engine 32'.

Upon receipt of the Request, the Interface 116, 118 stores the Job ID and information header, and translates the formatted message portion of the Request into the Native Applications Protocol and Native Communications Protocol understood by the Speech Recognition Legacy Protocol 122 or the New Protocol 124. If the Speech Recognition and Transcription Engine 32' can transcribe Requests expressed in the Normalized Data Format, then the Interface 120 simply validates the Request. In any event, the Interface 116, 118, 120 forwards the translated or validated Request to the Speech Recognition and Transcription Engine 32' using an appropriate Legacy Protocol 122, New Protocol 124 or Uniform System Protocol 126.

After receiving the Request, the Speech Recognition and Transcription Engine 32' generates a Response, which includes a transcription of spoken text, and transmits the Response to the System Transaction Manager 30' via the ASA Application Service Adapter 84 and the Speech Service Adapter 86. The Interfaces 116, 118, 120 locate and match the Job ID of the Response with the stored Transaction ID of the Request, retrieves the stored Request header, and if necessary, reformats the Response to conform to the Normalized Data Format. The ASA Application Service Adapter 84 forwards the Response (in Normalized Data Format) to the Speech Service Adapter Application using a communications protocol (e.g., TCP/IP) that is compatible with the Uniform System Protocol employed by the System Transaction Manager. The Routing process 114 within the Speech Service Adapter 86 forwards the Response to the System Transaction Manager 30', again using a communications protocol compatible with the Uniform System Protocol.

Following receipt of the Response, the Routing process 110 within the System Transaction Manager 30' notifies the accumulator process 108 that a Response has been received. The accumulator process 108 checks the session control table to determine if all Responses have been received for the original Request. If any Responses are outstanding, the accumulator process 108 goes into a waiting condition. If time expires on any Request, the timer process 112 notifies the accumulator 108 that a Request has been timed out. This process continues until all Responses to the original Request and any duplicate Requests have been received, have been timed out, or have been rejected because of an authorization 104 failure.

After the original Request and all duplicate Requests have been dealt with, the accumulator process 108 emerges from its wait condition and creates a single Response to the original Speech Information Request by combining all of the Responses from the targeted Speech Recognition and Transcription Engines. The accumulator process 108 dispatches an asynchronous message to the logging process 106, which logs the combined Response, and forwards the combined Response to the Routing process 110. The Routing process 110 reads the address of the Requesting User 22 and the addresses of any additional or alternative Recipients of the Response, and forwards the Response or Responses to the User Service Adapter 82 and, alternatively or optionally, to other appropriate User (Recipient) Service Adapters.

Focusing on the Requesting User 22', once the User Service Adapter 82 receives the Response, the Routing process 100 within the Adapter 82 directs the Response back to the User Application Service Adapter 80 having the appropriate Interface 94, 96, 98. The Routing process 100 within the User Service Adapter 82 determines the appropriate Interface 94, 96, 98 by examining the Response header or to whichever Interface initiated the transaction. Continuing the earlier example, the ASA Interface 94 reformats the Response, which is expressed in the Normalized Data Format, so that it is compatible with the Legacy Protocol 88 of the Requesting User 22'. As part of the translation process, the Interface ASA Interface embeds the Job ID in a header portion or message portion of the Response as is required by the Legacy Protocol 88.

Interface Between Users and System Transaction Manager

Figure 4:
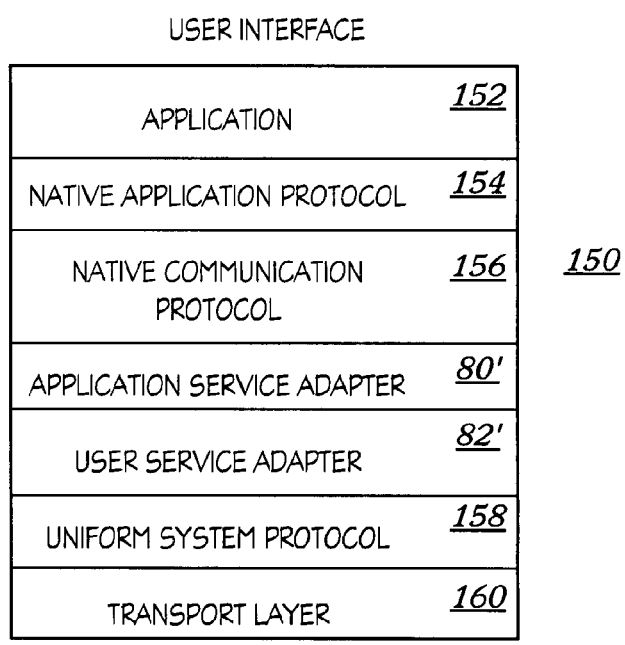
FIG. 4 is schematic drawing of a User Interface.

Turning to FIG. 4 a typical User Interface 150, is shown. This Interface 150 permits communication between the User 22' and the System Transaction Manager 30' as shown in FIG. 3. In FIG. 4, using an Application 152, running on a computer at the User 22' site, the Requesting User 22' generates a Speech Information Request, as previously described. The application 152 conforms to a Native Application Protocol 154, which by way of example generates a Speech Information Request that includes voice data stored for example in wave format. As noted above in discussing FIG. 3, the User 22' also employs a Native Communications Protocol 156 to enable transmission of the Speech Information Request to an Application Service Adapter 80'.

The Application Service Adapter 80' is an application layer that provides, among other things, bi-directional translation among the Native Application Protocol 154, the Native Communications Protocol 156, and a Uniform System Protocol 158 utilized by the System Transaction Manager 30'. Continuing with the example, the Application Service Adapter 80' converts and compresses the voice wave data conforming to the Native Application Protocol 154 to a Request complying with the Uniform System Protocol 158. A Transport layer 160 transfers the resulting Request to the System Transaction Manager 30' via, for example, streaming (real-time or near real time) output.

As noted above, a Speech Recognition and Transcription Engine 32' responds to the Request by generating a Response to the Speech Information Request. Following the generation and receipt of the Response from the System Transaction Manager 30', the Application Service Adapter 80' converts the Response so that it is compatible with the Native Application Protocol 154. The Requesting User 22' may then employ the Application 152 to correct and to manipulate the Response, which includes a transcription of the Speech in Rich Text Format (RTF), for example, as well as the original Speech (e.g., recorded voice wave data) or modified Speech (e.g., compressed and/or filtered, enhanced, etc. recorded voice wave data). Following correction, the User 22' may submit the transcription to the Application Service Adapter 80' for updating its User Profile, for storing in a site-specific document database, and so on.

The Application Service Adapter 80' may convert Requests, Responses, and the like using any mechanism, including direct calls to Application Programming Interface (API) services 96, cutting and pasting information in a clipboard maintained by the application's 152 operating system, or transmitting characters in ASCII, EBCDIC, UNICODE formats, etc. In addition the Application Service Adapter 80' may maintain Bookmarks that allow for playback of audio associated with each word in the Response (transcription). The Application Service Adapter 80' maintains such Bookmarks dynamically, which reflect changes to Response as they occur. Thus, during playback of words in the transcription, the Application 152 may indicate each word location by, for instance, intermittently highlighting words substantially instep with audio playback. As noted above, the User Interface 150 includes a Uniform System Protocol 158, which packages the voice wave data from the Application Service Adapter 80' (Request) into a Job, which the System Transaction Manager 30' transfers to the Speech Recognition and Transcription Engine 32'. The Job includes a user settings identification, which the Uniform System Protocol 158 uses for associating information required to process the Job. The Uniform System Protocol 158 compiles the Job information from a database, which the System Transaction Manager 30' maintains.

Job information includes identifications of the User profile and of the Speech Recognition and Transcription Engine 32'. The Job information may also include preexisting and user-defined language macros. Such macros include commands for non-textual actions (e.g., move cursor to top of document), commands for textual modifications (e.g., delete word), and commands for formatting text (e.g., underline word, generate table, etc.). Other Job information may include specifications for language, base vocabulary, topic or type of document (e.g., business letter, technical report, insurance form), Job notifications, correction assistant pool configuration, and the like.

The Uniform System Protocol 158 also packages Jobs containing User-corrected transcribed text and wave data, which provide pronunciations of new vocabulary words or words that the Engine 32' could not recognize. In addition to the System Transaction Manager's database, the User 22' may also maintain a database containing much of the Job information. Thus, the Uniform System Protocol 158 also permits synchronization of the two databases.

The Uniform System Protocol 158 assembles much of the Job with the help of a User Service Adapter 82'. Besides Job Routing services, the User Service Adapter 82' also provides an interface for maintaining the User profile and for updating Job processing settings. The User Service Adapter 82' thus provides services for finalizing a correction of the Response, which allows updating of the User profile with context information and with a pronunciation guide for words the Engine 32' could not recognize. The User Service Adapter 82' also provides services for creating new User profiles, for maintaining macros, for notifying the User of Job status, for modifying the correctionist pool configuration, and for archiving documents obtained from processing the Response.

System Transaction Manager

Figure 5:
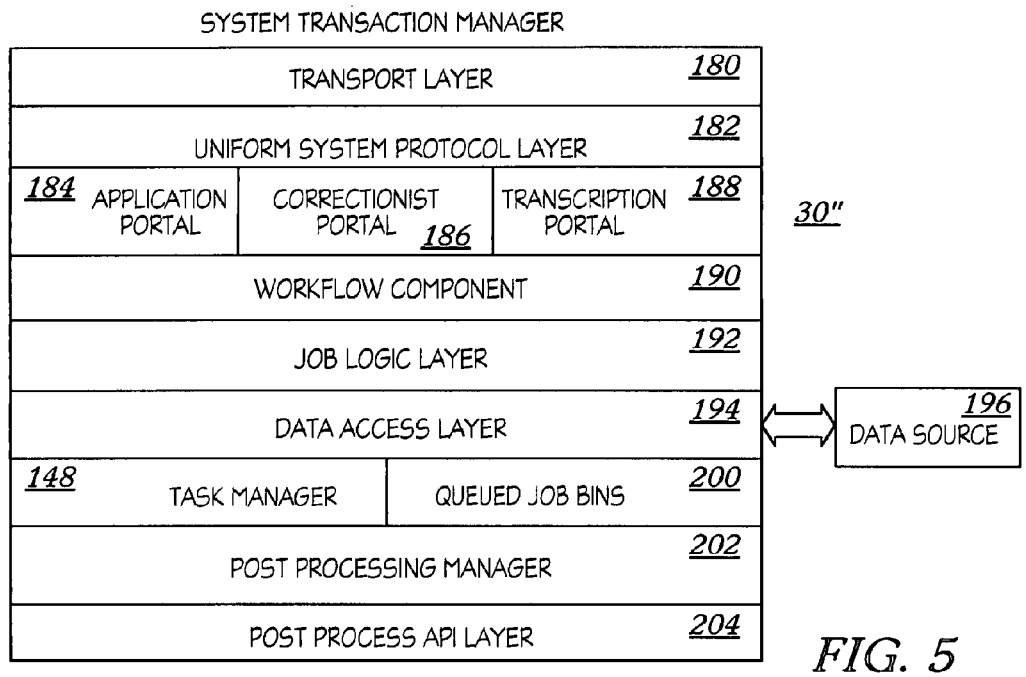
FIG. 5 is a schematic drawing of a System Transaction Manager.

FIG. 5 shows additional features of a System Transaction Manager 30". The System Transaction Manager 30" exchanges information with the User Interface 150 of FIG. 4 through their respective transport layers 180, 160. Data exchange between the Transport layers 160, 180 may occur in Real Time or near real time (streaming) or in batch mode, and includes transmission of Speech Information Requests and Responses and any other Job-related information. A connection database (not shown) contains information on where and how to connect the two transport layers 160, 180.

Following receipt of Job information from the Transport layer 180, a Uniform System Protocol Layer 182, within the System Transaction Manager 30", decodes the Job information (Requests, etc.) into a command and supporting data. The System Transaction Manager 30" routes the Job to an application portal 184, a Correctionist portal 186, or a speech recognition and transcription portal 188, based on the type of command/User profile update, Response correction, Speech Information Request. The uniform system protocol layer 182 decodes and authenticates each command in accordance with each specific portal's security requirements. The uniform system protocol layer 182 logs and rejects any Jobs that fail authentication. The System Transaction Manager 30" passes authenticated Jobs to a workflow component 190, which converts Jobs into an instruction set as specified by a job logic layer 192.

The System Transaction Manager 30" includes a data access layer 194, which stores or accesses any data in data source 196 that is necessary to support a Job. The data access layer 194 converts instructions requesting data into commands that are specific to a given database or databases designated by the Job (e.g. a SQL Server, an Oracle dB, OLE storage, etc.). The data access layer 194 usually includes two layers: a generic layer and a plug-in layer (not shown). The generic layer converts the data requests into standard commands, which the plug in layer converts into specific instructions for retrieving data from the database.

As can be seen in FIG. 5, a task manager 148 handles instructions pertaining to submission and retrieval of Jobs, which are placed into queued Job bins 200 to await processing (e.g., transcription of Speech). The task manager 148 adds Jobs to a particular Job bin 200 based on rules from the Job logic layer 192. These rules permit the task manager 148 to match a Job's requirements with processing capabilities associated with a particular Job bin 200 (e.g., language, base vocabulary, topic, User Macros, ASR Engine, Pre and Post Processing, etc.). Each Job bin 200 is associated with a set of Speech Recognition and Transcription Engines. The System Transaction Manager 30" creates or associates Job bins 200 for each networked Speech Recognition and Transcription Server 220 (FIG. 6), which may include one or more Engines, attached to the server, and transfers capability data. When a Server or Engine goes offline, the System Transaction Manager 30" removes it from the associated Job bins 200 referencing the Server or Engine. Jobs that update a User profile (i.e., training Jobs) force a lock on the profile, preventing other Jobs from referencing the User Profile. The System Transaction Manager 30" removes the lock when the training Job ends.

The task manager 148 releases Jobs based on priority rules, including whether an available Speech Recognition and Transcription Engine or Server has access to a valid copy of the Requesting User's Profile. Based on rules from the Job logic layer 192, the task manager 148 determines a match between, say, an available Speech Recognition and Transcription Engine residing on a particular Server and a Job awaiting processing in queued Job bins 200. The task manager 148 releases Jobs for processing only when each of the rules is satisfied. Such rules include parameters detailing how to process a Job, which the task manager 148 compares with the capabilities of particular Speech Recognition and Transcription Engines and Servers. The task manager 198 also handles pre and post processing of Jobs and cleanup of error conditions resulting from network interruptions, equipment failure, poor dictation audio, etc.

In order to satisfy rules imposed by the Job logic layer 192 or commands submitted by the Requesting User 22', the System Transaction Manager 30" flags certain Jobs for post processing as they finish. Post processing allows for additional operations to be performed on a Job by for example allowing any User-specific and/or automated system processing of the Job. A post-processing manager 202 adds the flagged Jobs (e.g., Responses) to a post-processing Job queue (not shown). When a post processor (which may be on any system in the network) becomes available, the post processing manager 202 releases Jobs singly or in batch, depending on the requirements of the post processor. For each post processor, the post processing manager 202 loads a component in system, which the post processing manager 202 keeps alive until the post processor detaches. Each post processor identifies what Jobs or commands it will operate on by providing the System Transaction Manager 30" with Job type specifications. As can be seen in FIG. 5, a post processing application program interface (API) layer 204 provides a common path for extracting Job data from the System Transaction Manager 30", which the post processor can use for post processing.

Speech Recognition and Transcription Server

FIG. 6 provides a functional description of a Speech Recognition and Transcription Server 220, which includes a Speech Recognition and Transcription Engine 32" for automatically transcribing Speech Information Requests. Although FIG. 6 shows a Speech Recognition and Transcription Server 220 having a single ASR Engine 32', in general the Server 220 would include multiple ASR Engines.

The Server 220 exchanges information with the System Transaction Manager 30" of FIG. 5 through their respective Transport layers 222, 180 using a Uniform System Protocol 224, 182. Data exchange between the Transport layers 222, 180 may occur in Real Time or near real time (streaming) or in batch mode, and includes transmission of Speech Information Requests, Responses, and any other Job-related information, including User Profile Updates. A connection database (not shown) provides information on where and how to connect the two transport layers 222, 180. In the event that a connection fails, data is cached into a local database to await transfer once communication is reestablished.

The Server 220 includes a pipeline Manager 221, which manages one or more workflow pipelines 226, which control processing of Jobs. Each of the workflow pipelines 226 is coupled to a specific Speech Recognition and Transcription Engine 32' via an Speech Recognition Service Adapter 84'. When a particular workflow pipeline 226 becomes available to process a Job, it notifies the System Transaction Manager 30" (FIG. 5) via the transport layer 222. Upon its receipt within the appropriate workflow pipeline 226, the Job is stored in the local Job queue 225 while it undergoes processing.

Processing includes a preprocess step which may comprise validation of the Job, synchronization of a Job-specific User profile with a local cached version, and synchronization of a User-specific database containing dictation macros, training information and the like. The Synchronization State is specified by the Job or by the User-specific profile and database.

The Audio Preprocess Service Adapter 228 is comprised of a vendor independent APE Interface 234 and a vendor dependent APE interface 236 which provides the linkage to an external audio prepost process engine (APE) 232. The audio prepost process engine 232 can reside on the Server 220, a Workstation/workgroup or any other external system. The audio preprocess adapter 228 extracts the audio portion from the Job and loads an appropriate audio prepost process engine 232, which prepares the audio stream in accordance with instructions contained within the Job or embedded in the audio stream itself. Processing of the audio stream can include audio decompression, audio conversion, audio restoration, audio impersonation (user independent), and extraction of embedded audio commands, which are processed, separately from any spoken commands and audio segmentation. In other embodiments, the audio preprocess engine maps the audio data into segments that are marked for processing by specific ASR Engines 32' in a speech-to-text mode or a speech-to-command mode. In the latter embodiment, embedded commands direct how the segments are coupled for execution.

The workflow controller 238, operates on audio preprocess engine 232 output. In one embodiment, the workflow controller 238 loads, configures, and starts the automatic Speech Recognition Service Adapter 84' to process audio data as a single data stream. In other embodiments, the workflow controller 238 creates a task list, which references ASR application service adapters associated with separate ASR Engines 32'. In such embodiments, the workflow controller 238 configures each of the ASR application service adapters to process various segments, that the audio pre/post process engine 232 has marked, for processing by the separate ASR Engines 32'. The latter embodiment allows for selecting separate ASR Engines 32' for speech-to-text processing and for speech-to-command processing. Commands can be executed in real-time or near real time, or converted into a script for batch mode post processing.

In any case, the workflow controller 238 loads, configures, and starts the ASR Application Service Adapter 84' to begin processing a Job. As can be seen in FIG. 6, the ASR Application Service Adapter 84' includes a vendor independent ASR interface 240, which provides the System Transaction Manager 30" with ASR Engine 32" settings and with Job information to assist in determining the appropriate ASR Engine 32' to process a given Job. The vendor independent ASR Interface 240 also creates a vendor dependent ASR Interface 242 object and passes the ASR settings, as well as any other data necessary to process the Job to the System Transaction Manager 30" (FIG. 5). The vendor dependent ASR Interface 242 initializes the ASR Engine 32" with ASR Engine-specific process settings and with preprocessed audio data from the audio pre/post process engine 232, which the ASR Engine 32' transcribes in accordance with the process settings. Process settings include User ID or Speaker Name, vocabulary, topic, etc.

As described above, the Speech Recognition and Transcription Engine 32' generates a Response to the Speech Information Request, which comprises a transcription of the Speech contained in the Request. The transcription thus includes spoken text, as well as any text formatting that results from spoken commands or embedded commands (e.g., automatic form generation based on topic, spoken command, embedded command, macro, etc.). During processing, the Engine 32' may carry-out the following actions for each word that it recognizes, if appropriate:

Store information about the word for later retrieval;
Apply any associated dictation macro;
Apply inverse text normalization (i.e., automatic text spacing, capitalization, and conversion of phrases to simpler forms e.g., conversion of the phrase "twenty five dollars and sixteen cents" to "$25.16");
Format the word relative to its surrounding context in a document;
Insert resulting text into an internal target document;
Associate a bookmark with inserted text;

Update flags relative to a document's format context to prepare for the next word; and any other function related to a specific Engine 32" such as training for context and for word recognition.

Following processing by the ASR Engine 32', the ASR Application Service Adapter 84' retrieves the processed Speech (transcription), and stores the processed Speech for subsequent transmission to the System Transaction Manager 30".

For Jobs updating a User profile, processing completes when context data is successfully trained or the ASR Engine 32' compiles a list of unrecognized words. Following updating, the Server 220 synchronizes the User Profile, a database maintained by System Transaction Manager 30", or maintained by a separate application and accessed by System Transaction Manager 30".

The skilled artisan will realize that many audio input sources may be used in accordance with the instant invention. These inputs are capable of handling aspects involving training a User Profile in addition to providing means of recording speech and handling document retrieval. For example, A Thin Client pertains to an application that provides the minimum capability of recording speech and streaming audio to the System Transaction Manager. Telephony pertains to an application that allows a user to connect using a telephone line and provides audio menus to allow a user to navigate through choices such as those that allow a user to enter its ID, record speech, review and edit the speech, submit the audio recording to the System Transaction Manager, and update the User Profile. A Recorder pertains to any of the hand held devices capable of recording speech and of transferring the recording to a computer directly as well as with the use of an A/D converter.

The above description is intended to be illustrative and not restrictive. Many embodiments and many applications besides the examples provided would be apparent to those of skill in the art upon reading the above description. The scope of the invention should therefore be determined, not with reference to the above description, but should instead be determined with reference to the appended claims, along with the full scope of equivalents to which such claims are entitled. The disclosures of all articles and references, including patents, patent applications and publications, are incorporated by reference in their entirety and for all purposes.

What is claimed is:

1. A system for facilitating the exchange of speech recognition and transcription among users, the system comprising:
   at least one system transaction manager, using a uniform system protocol, adapted to provide bi-directional translation between legacy protocols and the uniform system protocol and to receive a speech information request from at least one of the users employing a first user legacy protocol, and configured to route a response to one or more of the users employing a second user legacy protocol, the response comprised of a formatted transcription of formatted spoken text; and
   at least one speech recognition and transcription engine employing a third legacy protocol in communication with the system transaction manager, the speech recognition and transcription engine configured to receive the speech information request from the system transaction manager, to generate a response to the speech information request, and to transmit the response to the system transaction manager; wherein the system transaction manager translates between the first user legacy protocol and the uniform system protocol, between the second user legacy protocol and the uniform system protocol, and between the third legacy protocol and the uniform system protocol.

2. The system of claim 1 wherein said first user legacy protocol is the same as or different than the second user legacy protocol.

3. The system of claim 1 wherein the system transaction manager is adapted to receive the speech information request from a subscriber.

4. The system of claim 1 wherein the speech information request comprises formatted spoken text.

5. The system of claim 4 wherein the formatted spoken text is generated speech information to be transcribed and routed to the one or more users of the system.

6. The system of claim 1 wherein the speech information request comprises previously transcribed formatted spoken text.

7. The system of claim 6 wherein the previously transcribed formatted spoken text includes previously transcribed speech.

8. The system of claim 1, further comprising at least one application service adaptor to provide bi-directional translation between legacy protocols and the uniform system protocol.

9. The system of claim 8, wherein said at least one application service adaptor comprises (i) a first user application service adapter, the first user application service adapter communicating with the at least one of the users that employ the first user legacy protocol and with the system transaction manager, (ii) a second user application service adapter, the second user application service adapter communicating with the one or more users that employ the second user legacy protocol and with the system transaction manager, and providing the one or more users with the response, and (iii) a speech recognition service adaptor, the speech recognition service adaptor communicating with one or more speech recognition and transcription engines that employ a legacy protocol and with the system transaction manager, the speech recognition and transcription engine configured to receive the speech information request from the system transaction manager to generate a response to the speech information request and to transmit the response to the system transaction manager.

10. The system of claim 9, wherein the first user application service adapter and the second user application service adapter and the speech recognition service adaptor are different.

11. The system of claim 1, wherein the at least one speech recognition and transcription engine communicates with the system transaction manager through a speech recognition service adapter.

12. The system of claim 1 wherein the at least one speech recognition and transcription engine resides on a speech recognition and transcription server.

13. The system of claim 1 further comprising multiple system transaction managers.

14. A system for facilitating speech recognition and transcription among users, the system comprising:
   a system transaction manager using a uniform system protocol, and configured to receive a speech information request from at least one of the users, the speech information request comprised of formatted spoken text generated from a first user legacy protocol;
   a speech recognition and transcription engine communicating with the system transaction manager, the speech recognition and transcription engine configured to receive the speech information request from the system transaction manager in a speech recognition protocol to generate a response to the speech information request, and to transmit the response to the system transaction manager which routes the response to one or more of the users that utilize a second user legacy protocol; and an application service adapter configured to provide bi-directional translation (i) between the first user legacy protocol and the uniform system protocol; (ii) between the second user legacy protocol and the uniform system protocol; and, (iii) between the speech recognition protocol and the uniform system protocol, wherein the system transaction manager utilizes the uniform system protocol for handling the speech information request and the response, and the response to the speech information request comprises a formatted transcription of the formatted spoken text.

15. A system for facilitating speech recognition and transcription among users, the system comprising:

a system transaction manager, the system transaction manager utilizing a uniform system protocol for handling speech information requests and responses to speech information requests, the speech information requests and responses comprising, respectively, formatted spoken text and formatted transcriptions of the formatted spoken text;

a first user application service adapter communicating with at least one user and the system transaction manager, the first user application service adapter configured to generate speech information requests from spoken text produced by the at least one of the users through a first protocol;

a speech recognition and transcription engine communicating with the system transaction manager through a speech recognition service adaptor, the speech recognition and transcription engine configured to receive speech information requests from the system transaction manager, to generate responses to the speech information requests, and to transmit the responses to the system transaction manager; and a second user application service adapter communicating with one or more of the users and with the system transaction manager, the second user application service adapter which can be the same or different than the first user application service adapter and configured to provide the one or more users with a transcription of the spoken text that is compatible with a second protocol, the second protocol being the same as or different than the first protocol.

16. A method of exchanging transcribed spoken text among users, the method comprising:

generating a speech information request from spoken text obtained through a first user legacy protocol, the speech information request comprised of formatted spoken text;

transmitting the speech information request from a system transaction manager using a uniform system protocol to a speech recognition and transcription engine using a speech recognition protocol;

generating a response to the speech information request using the speech recognition and transcription engine, the response comprised of a formatted transcription of the formatted spoken text using a speech recognition protocol;

transmitting the response to a user via the system transaction manager; and providing the user with a transcription of the spoken text that is compatible with a second user legacy protocol that is different than the first legacy protocol, wherein the transmitting steps include translating between the first user legacy protocol and the uniform system protocol, a speech recognition protocol and the uniform system protocol, and between the second user legacy protocol and the uniform system protocol, respectively.

17. A method of exchanging transcribed spoken text among users, the method comprising:

generating a speech information request from spoken text obtained through a first protocol, the speech information request comprised of formatted spoken text generated using a first user application service adapter;

transmitting the speech information request from a system transaction manager using a uniform system protocol to a speech recognition and transcription engine in a speech recognition protocol using a speech recognition service adaptor;

generating a response to the speech information request using the speech recognition and transcription engine, the response comprised of a formatted transcription of the formatted spoken text in a speech recognition protocol using a speech recognition service adaptor;

transmitting the response to the system transaction manager using a uniform system protocol; and, providing the user with a processed transcription of the spoken text via the system transaction manager using a second user application service adapter, the processed transcription being compatible with a second protocol that is different than the first protocol.

* * * * *

UNITED STATES PATENT AND TRADEMARK OFFICE
CERTIFICATE OF CORRECTION

PATENT NO. : 7,949,534 B2  
APPLICATION NO. : 12/497675  
DATED : May 24, 2011  
INVENTOR(S) : Michael K. Davis et al.

Page 1 of 1

It is certified that error appears in the above-identified patent and that said Letters Patent is hereby corrected as shown below:

On the Title page of the patent, please correct the Related U.S. Application Data at item (63) as follows:

Replace:

(63) Continuation of application No. 11/824,794, filed on Jul. 3, 2007, now Pat. No. 7,558,730.

With:

(63) Continuation of application No. 11/824,794, filed on Jul. 3, 2007, now Pat. No. 7,558,730, which is a continuation of application No. 09/996,849, filed on Nov. 27, 2001, now abandoned.

Signed and Sealed this
Twenty-sixth Day of April, 2016

Michelle K. Lee
*Director of the United States Patent and Trademark Office*